2,502,267

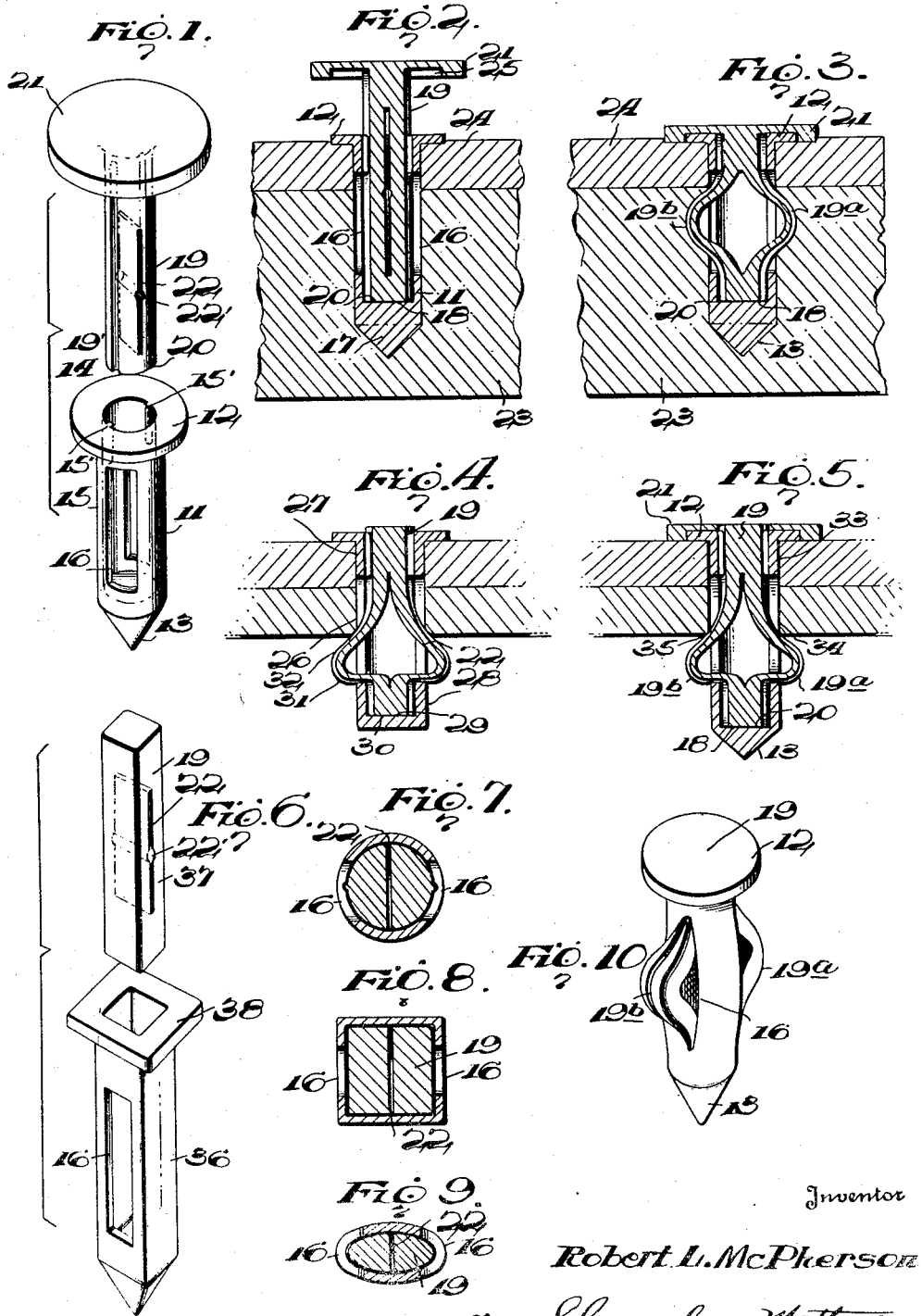
March 28, 1950 — R. L. McPHERSON — 2,502,267
SELF-CLINCHING FASTENER
Filed March 13, 1946
Inventor
Robert L. McPherson Patented Mar. 28, 1950

UNITED STATES PATENT OFFICE 2,502,267

SELF-CLINCHING FASTENER

Robert L. McPherson, Arlington, Va.

Application March 13, 1946, Serial No. 654,103

5 Claims. (Cl. 85—5)

This invention relates to fasteners and more particularly to fasteners of the self-clinching type.

My fasteners are particularly adapted for use in the construction field for securing shingles to gypsum board or similar board which is used as a substitute for siding but, of course, the fastener has other uses, such as securing shingles to siding of a different character and for securing two overlapped metal or wood strips or sheets or structural elements, such as beams, angle irons etc. and many other purposes.

In securing shingles to siding, particularly where gypsum board is used as such siding, and in other structural fields, the fasteners now obtainable are of the character that requires a man within the building and one exteriorly thereof to properly secure the shingles, one workman outside driving the fasteners through and one on the inside bending or clinching the same. This is a rather expensive procedure in that two workmen are required and then, too, the securing depends upon the skill of the workmen in clinching the fastener from the inside of the building structure. There are other types of fasteners for shingles which are not satisfactory in that they will not permanently remain self-clinching and, therefore, there is a tendency for such type of fasteners to become loosened and consequently shingles will either fall from the siding or be ineffectively secured thereto. In using my fasteners only one workman is required because the fastener which is self-clinching will automatically effect a permanent locking and association of the shingle with the siding or with any other two elements or parts that are to be secured together.

With the foregoing in mind, it is an object of my invention to provide a self-clinching fastener which is of simple and inexpensive construction and yet one which is durable and effective in its permanent securing features.

Another object of my invention is to provide a self-clinching fastener of the type to be driven into position or inserted in position for securing together two separate parts or elements, regardless of what they may be, and consists of one element insertible within another element and assembled therewith and to be forcibly driven home or inserted within registered openings and effecting a self-clinching or locking of the fastener, thus securing the two or more elements permanently together.

Another object of my invention is to provide a self-clinching fastener which will automatically expand into relatively soft materials, such as gypsum board, wall board, Masonite, plaster board etc. and firmly and permanently affix shingles or other structural elements thereto.

Another object of my invention is to provide a self-clinching fastener consisting of concentrically arranged elements, the inner one of which being adapted to expand beyond the outer element and serving to permanently secure two parts together, regardless of the nature of the two parts.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Figure 1 is an exploded view of the two elements of my invention;

Figure 2 is a vertical sectional view showing the fastener applied to two parts to be secured together, with one of the elements of the fastener about to be driven to an expanded and clinching condition;

Figure 3 is a vertical sectional view showing the two elements of the self-clinching fastener in effective securing position and permanently uniting the two parts to be secured together;

Figures 4 and 5 are modifications of the invention wherein the self-clinching fastener is shown in vertical sectional views as permanently securing two overlapped portions of metal or wood;

Figure 6 is an exploded perspective view similar to Figure 1, disclosing a further modification with respect to the contour of the two elements of the fastener;

Figures 7, 8 and 9 are horizontal sectional views disclosing a still further modification of the invention as regards the exterior shape or contour of the two elements comprising the fastener; and Figure 10 is a perspective view of the complete fastener, showing the outwardly expanding clinching means.

Like numerals in the several figures of the drawings denote the same parts.

The invention will be more readily understood by referring to the drawings in detail, wherein Figures 1, 2 and 3 disclose the self-clinching fastener as consisting of a tubular outer nail element 11 provided at one end with an enlarged head 12 and at its other end with a point 13. This outer nail element 11 is hollow, as denoted at 14, and the body 15 thereof is provided intermediate of the head and point with diametrically opposed cut-out portions or openings 16. The point 13 is a substantially solid tapering body and provides inwardly of the tubular element an abutment 18. This abutment 18 with a portion of the adjacent wall of the tubular element 11 provides a cup formation for a purpose presently explained.

The other element constituting the fastener consists of a shank 19 which is provided with a flattened end 20 and an enlarged head or cap 21 at the other end thereof. Intermediate the ends this shank 19 is split or cut as at 22 and further weakened at 22′ with an opening and both the split and opening extending clear through the diameter of the shank. The shank is of substantially the same diameter and shape as the hollow opening 14 within the element 11 thereby providing for telescoping or concentrically arranging the shank 19 in the hollow portion 14 of the element 11.

As seen in Figure 2, the assembled outer and inner elements have been driven into a support 23, such as siding or roofing or wall board, such as Masonite, Celotex, fiber boards, gypsum board or the like, for securing a shingle or other part 24 thereto. The flattened end 20 of the shank seated on said abutment 18 within the aforesaid cup formation maintains the inner end of the shank in axial alignment with the tubular element or prevents lateral displacement of the inner end of said shank as the split shank is operated upon. Thus the shank with its attached head 21 is projecting above or beyond the head 12 of the element 11 with the flattened end 20 of the shank seated in said cup formation, as seen in Figure 2, the head 12 engaging the shingle and acting as a stop. When the head 21, which is countersunk or recessed on its under side, as at 25, is hit with a hammer or other tool, the intermediate portion of the shank 19, which is split or cut at 22 and weakened at 22′ will open and the divided parts thereof 19a and 19b will expand and extend outwardly through and beyond the oppositely disposed openings 16 and will be firmly embedded in the support 23, thus clinching and effectively securing the shingle or the like 24 to its support 23. When this fastener is in self-clinching and locking operation the countersunk portion 25 of the head 21 will completely surround the head 12, forming a very snug fit and engagement therewith and effect a substantially waterproof connection so that water or snow or ice will be prevented from working its way around the nail and into the same and thus corrosion of the fastener is prevented. A waterproof washer, not shown, may rest in the recess 25.

In Figure 4 the self-clinching fastener is shown as securing two overlapped metal parts which may be sheets or strips or structural elements, such as I-beams, angle irons etc. The essential characteristics of this modification of the invention are substantially the same as those heretofore described. However, in joining certain structural or like elements together it is not necessary that the shank 19 be provided with the head 21. In using the fastener of Figure 4 the two metal parts are provided with registered openings 26 and 27 and the assembled outer and inner elements 19 and 28, respectively, are simply placed in the registered openings and, therefore, requires no driving point in this form as in the invention of Figures 1–3. In this instance, the end of the outer element 28 is simply closed and preferably flat, as at 29, which serves as the abutment for the end 30 of the inner or shank element 19 which is split and weakened in the same manner as at 22, such as in Figure 1, and when in fixed relationship, as in Figure 4, the split portions 31 are expanded through the opposed openings in the outer element and extend beyond an opening at the inner side of one of the metal sheets or the like and thus firmly grip this sheet adjacent the opening as at 32, thus preventing any accidental disengagement of the two sheets or structural elements, whatever they may be.

In Figure 5 the structural features of the invention are identical with the structural features as in Figures 1–3 and here the fastener is shown as being driven into and forming registered openings 33 and 34 in overlapping wood strips or sheets or the like, or such sheets may be Beaver board, Masonite, gypsum board or similar material. When the shank 19 of the inner element is driven home the intermediate weakened and slit or cut portion thereof will expand and firmly grip one of the wood strips or the like as at 35 adjacent an opening and effectively secure these sheets or strips or whatever they may be together.

In Figures 1–5 and 7 and 10 there are oppositely disposed ribs 15′ provided interiorly of outer element 11 and correspondingly shaped grooves 19′ on the shank 19 which act as guides for the two elements when assembled to align the two portions 19a and 19b with the openings 16 so that they will readily spread apart as seen in Figures 3–5 and 10.

In the described Figures 1–5 of the drawings, the fastener is shown as of round or circular contour. In Figure 6, however, it is clear that this fastener may assume a polygonal contour with regard to each of the elements 36 and 37 and, of course, the head 38 of the outer element 36 may be polygonal, and the shank 19 may have a polygonal head, not shown, and be countersunk the same as in Figure 2, or the head of the inner element 19 may be eliminated as in Figure 4.

In Figures 7, 8 and 9 the fastener is shown as being of circular or round contour, polygonal contour and oval contour, respectively. Other than the difference in shape of these fasteners in Figures 7, 8 and 9, the structural characteristics are precisely the same as in Figures 1–6.

In Figure 10 the fastener is similar in every respect to that of Figures 1–3, except for the fact that the shank 19, which is the inner element, is not provided with a head and when driven home the top of this shank 19 is flush with the top of the head 12 of the outer element.

From the foregoing it will be clear that I have provided a self-clinching fastener which may be used for any purpose for which it is adapted and in the several modifications disclosed the same consists of assembled outer and inner elements, the head of the former of which acts as a stop when driven or otherwise engaging in an opening and the latter, when driven home to clinching condition, has portions of its shank intermediate its ends which will oppositely expand due to the stop and the end thereof being in engagement with an abutment within the outer element, and the expanding portions of the inner element will pass beyond the wall of the outer element and firmly embed themselves into a support of any kind, or engage one of two parts, such as wood or metal, adjacent an opening therein, for securing such parts together.

While it is understood that the two elements of the fastener are to be driven simultaneously for securing shingles or the like to siding, it might in some instances be advisable to first drive the outer element into place and then insert the inner element and then by forceful blows of a hammer or the like cause the same to expand and effect a locking of the shingle or the like to the siding or other support. Then, too, instead of splitting the shank 19 intermediate its ends, this split or cut might extend down through the end of the shank and when the shank is inserted in the outer element, as in Figure 2, the ends thereof will be prevented from being displaced but the intermediate portion will expand as at 19a and 19b, as in Figure 3. In other words, for purposes of manufacture, it might be less costly to split the shank entirely through its lower portion rather than only intermediate its ends.

I claim:

1. A self-clinching fastener for securing two parts together, consisting of an outer tubular element provided inwardly thereof adjacent a pointed end with an abutment and the other end having a head thereon, said element having oppositely disposed openings intermediate the ends thereof, an inner element consisting of an elongated shank having snug fit within the walls of the outer element and provided with a head at one end and a flattened portion at the other end in engagement with the abutment within the outer element and being split intermediate its ends, the head of the inner element being recessed on its under side whereby when the inner element is forcibly driven against the abutment the split shank will expand so that parts thereof will extend through and beyond the openings in the outer element and the head of the outer element will be in position in the recess provided in the head of the inner element.

2. A fastener comprising a tubular outer element having a closed end and an open end with a head at said open end, the closed end forming an interior abutment within the outer element, the outer element also having oppositely disposed openings between the closed and open ends of the same, the said abutment with portions of the walls of the tubular element providing a cup between said closed end and said openings, and an inner member insertible into the tubular element and having a split portion intermediate the ends thereof and provided also with a flat end insertible into said cup to engage said abutment so that upon applying force against the outer end of the inner element, the split portion of the inner element is expanded at opposite sides and extended through the respective openings of the outer element for fastening purposes.

3. A fastener comprising a tubular outer element having a closed end and an open end with a head at said open end, the closed end forming an interior abutment within the outer element, the outer element also having oppositely disposed openings between the closed and open ends of the same, the said abutment with portions of the walls of the tubular element providing a cup between said closed end and said openings, and an inner member insertible into the tubular element and having a split portion intermediate the ends thereof and provided also with a flat end insertible into said cup to engage said abutment so that upon applying force against the outer end of the inner element, the split portion of the inner element is expanded at opposite sides and extended through the respective openings of the outer element for fastening purposes, said cup holding the inner end of the inner member against accidental lateral displacement from the abutment and maintaining the inner end of said element in axial alignment with the outer end of the inner element during expanding action of the inner element between said ends.

4. A fastener consisting of telescopically disposed elements, the outermost element of which has a head thereon at one end thereof and includes a combined abutment and cup adjacent the other end thereof and having oppositely disposed side openings therein spaced from the combined abutment and cup and the headed end, and the innermost of which elements is split and adapted to expand intermediate its ends only and pass through and beyond the openings in the outermost element for fastening purposes when force is applied to the innermost element.

5. A fastener comprising a tubular outer element having a closed end and an open end with a head at said open end, the closed end forming an interior abutment within the outer element, the outer element also having oppositely disposed openings between its ends, an inner member insertible into the tubular element and split intermediate its ends and having a flat end for engagement with the abutment in the outer member, means integral with the outer element adjacent the abutment for maintaining and holding the end of the inner element in axial alignment with the outer element when force is applied to the inner element to expand the split portions thereof to project into the openings in the outer element for fastening purposes.

ROBERT L. McPHERSON.

REFERENCES CITED

The following references are of record in the file of this patent:

UNITED STATES PATENTS

| Number | Name | Date |
|---|---|---|
| 563,050 | Milner | June 30, 1896 |
| 1,256,311 | Hartwig | Feb. 12, 1918 |
| 2,006,813 | Norwood | July 2, 1935 |
| 2,148,977 | Buck | Feb. 28, 1939 |